May 6, 1952 C. V. BRADY ET AL 2,595,446
VALVED BAG AND ITS MANUFACTURE
Filed Sept. 4, 1948 4 Sheets-Sheet 1
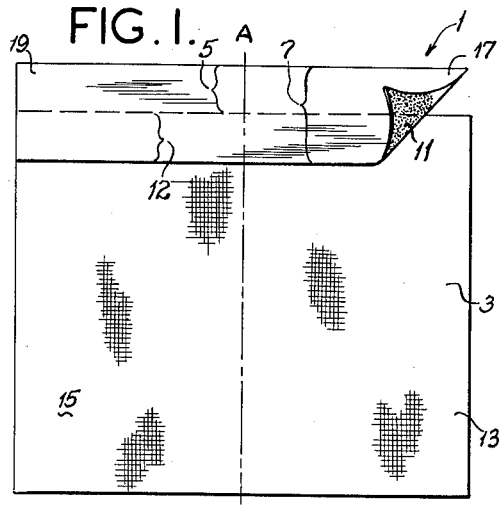
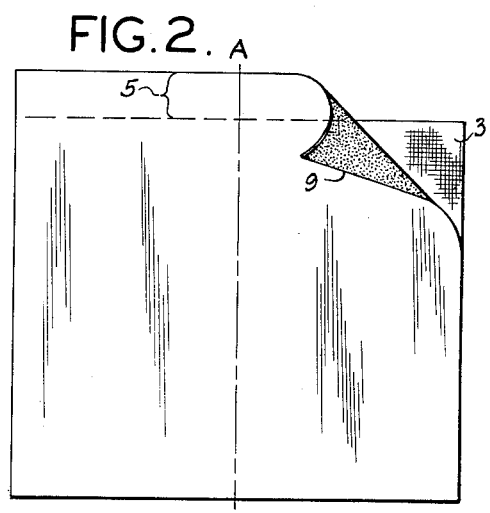
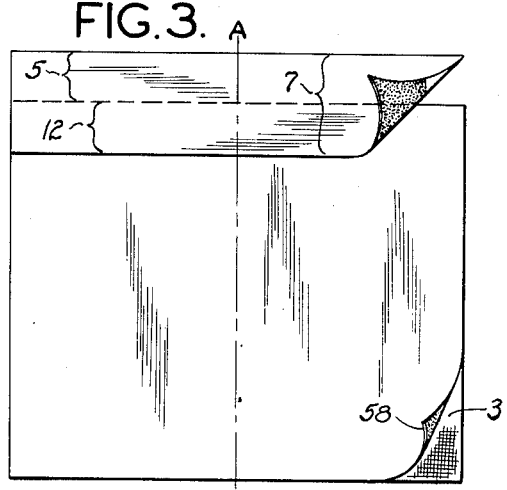
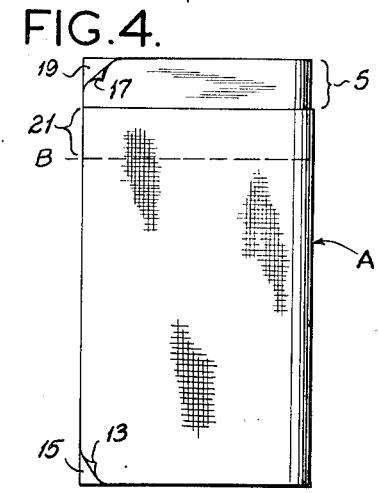
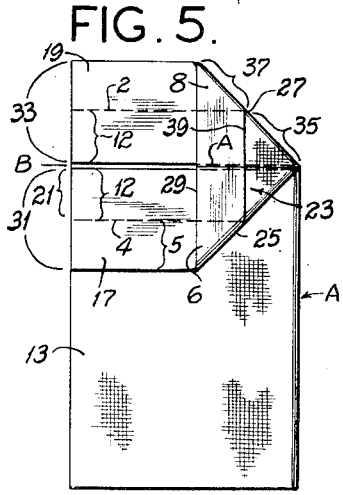
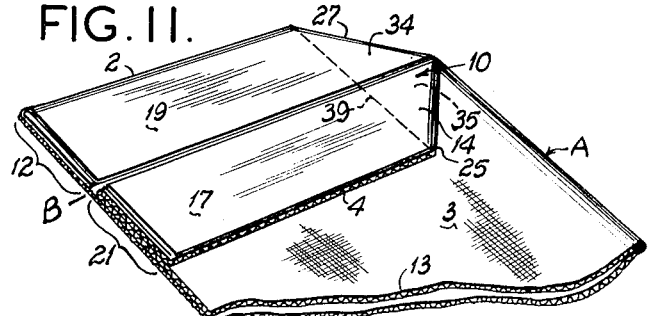
Charles V. Brady,
August F. Ottinger,
Inventors.
Haynes and Koenig.
Attorneys.

May 6, 1952 C. V. BRADY ET AL 2,595,446
VALVED BAG AND ITS MANUFACTURE
Filed Sept. 4, 1948 4 Sheets-Sheet 2
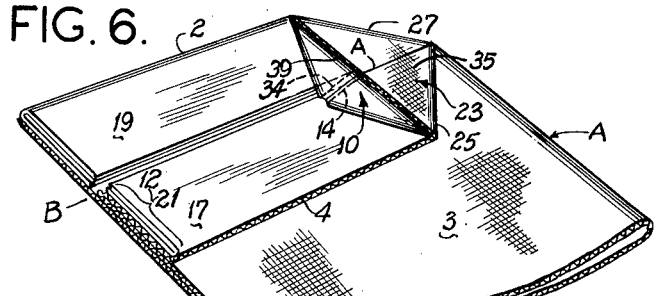
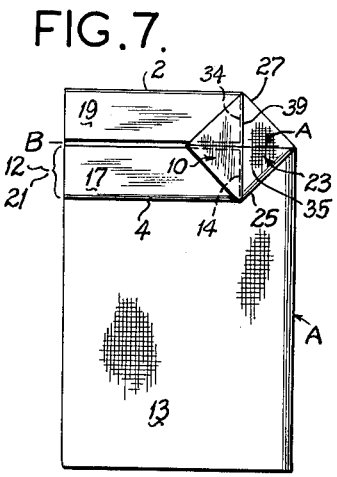
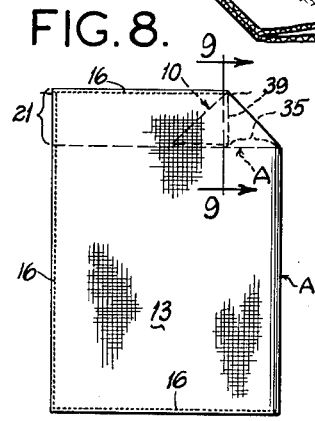
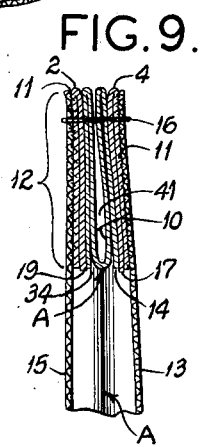
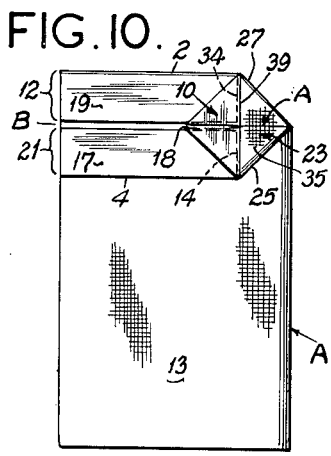
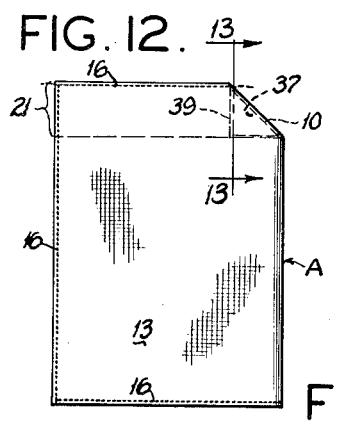
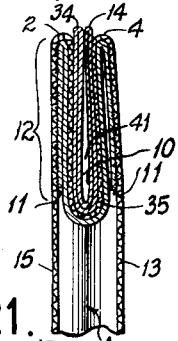
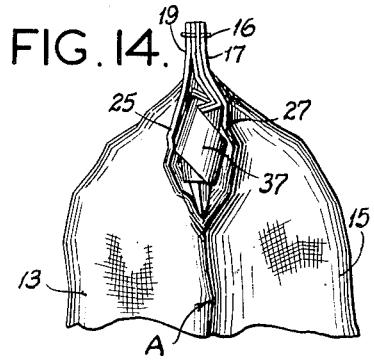
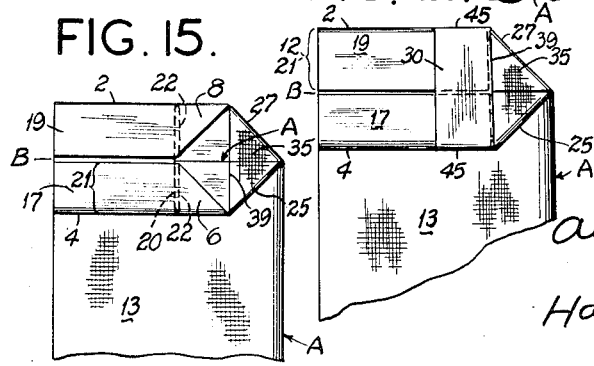
Charles V. Brady,
August F. Ottinger,
Inventors.
Haynes and Koenig,
Attorneys.

May 6, 1952
C. V. BRADY ET AL
2,595,446
VALVED BAG AND ITS MANUFACTURE
Filed Sept. 4, 1948
4 Sheets-Sheet 3
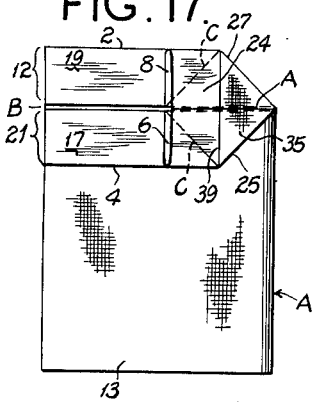
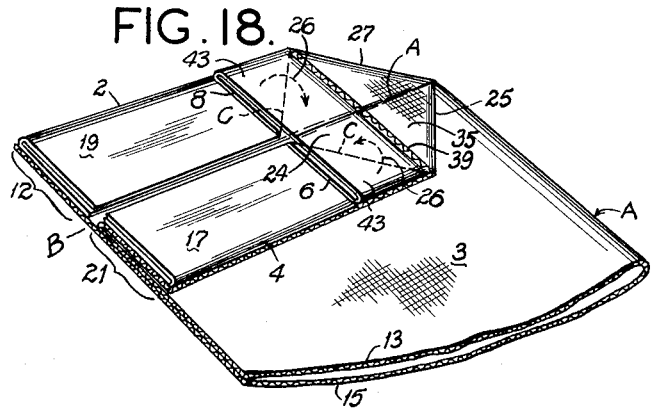
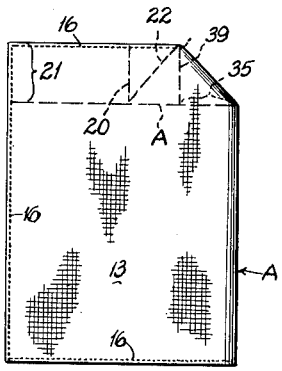
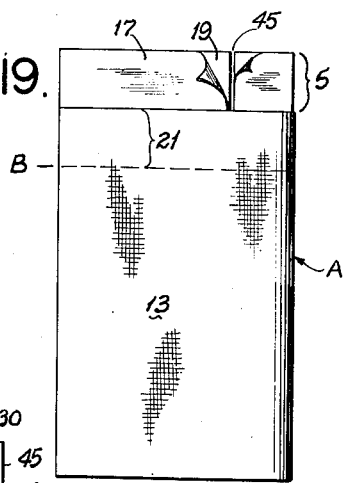
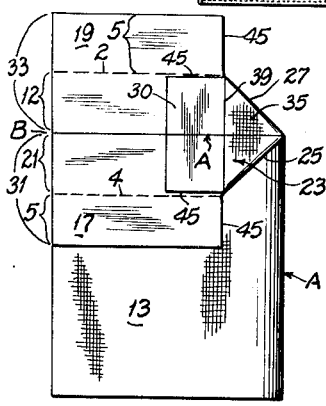
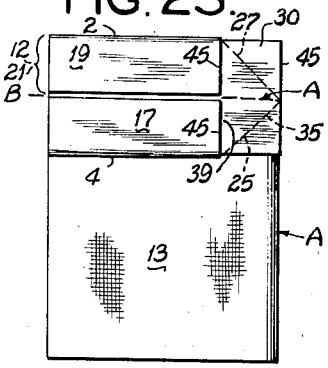
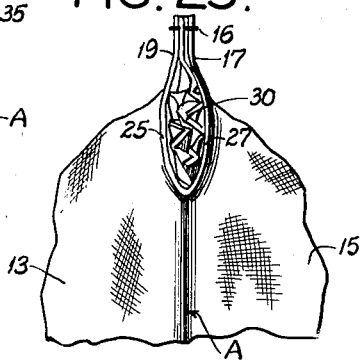
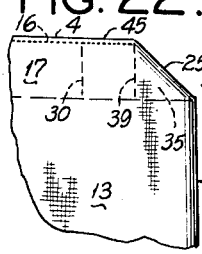
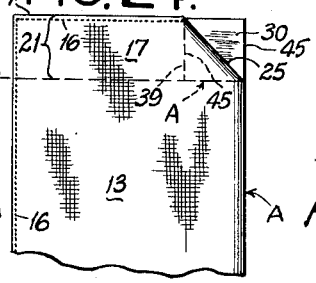

May 6, 1952 C. V. BRADY ET AL 2,595,446
VALVED BAG AND ITS MANUFACTURE
Filed Sept. 4, 1948 4 Sheets-Sheet 4
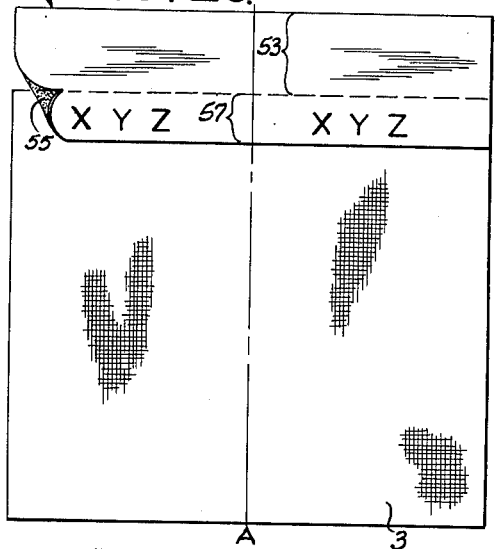
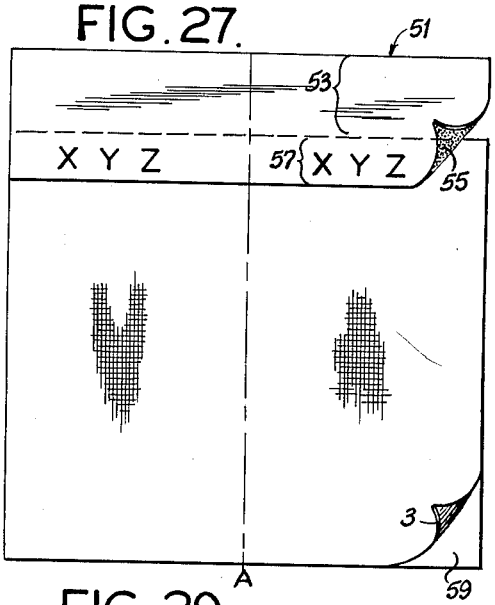
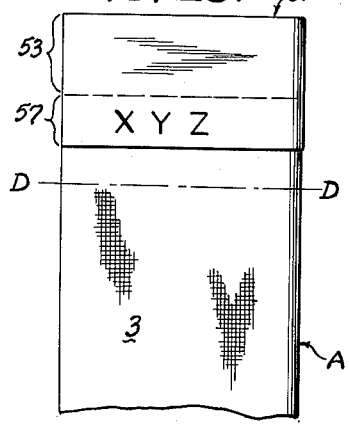
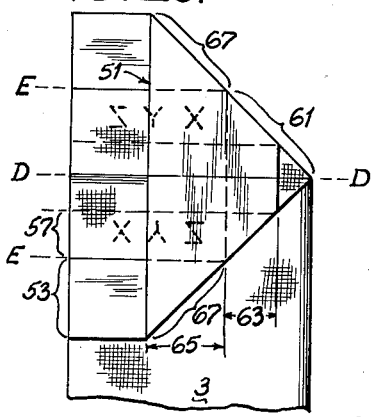
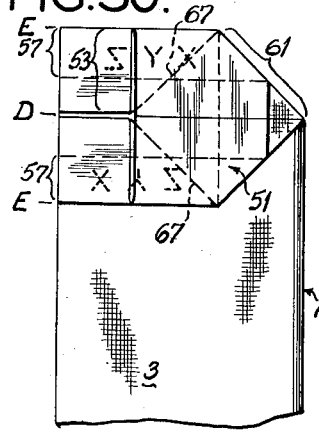
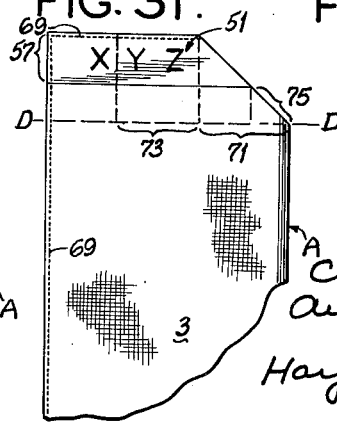
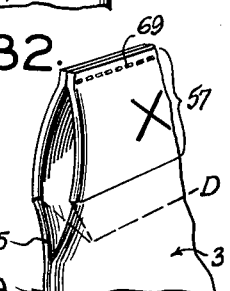
Charles V. Brady,
August F. Ottinger,
Inventors.
Haynes and Hoenig
Attorneys.

Patented May 6, 1952

2,595,446

UNITED STATES PATENT OFFICE 2,595,446

VALVED BAG AND ITS MANUFACTURE

Charles V. Brady and August F. Ottinger, St. Louis, Mo., assignors to Bemis Bro. Bag Company, St. Louis, Mo., a corporation of Missouri Application September 4, 1948, Serial No. 47,908

17 Claims. (Cl. 229—62.5)

This invention relates to valved bags, and more particularly to valved bags having improved valve sleeves, and also relates to methods of their manufacture.

Among the several objects of the invention may be noted the provision of a valved bag embodying an improved valve sleeve extending over a substantial (preferably full) width of the bag for greater strength; the provision of a valved bag of the class described embodying a valve sleeve which may be formed into a variety of valves; the provision of a valved bag of this class affording added stiffening resulting in greater ease in handling and packing; the provision of a valved bag such as described embodying a valved sleeve which may be secured to the bag web in a substantially continuous manner affording economy of manufacture; the provision of a variety of improved valves for valved bags of this class; and, the provision of a valved bag such as described embodying a valve sleeve adaptable as a removable label for the display of advertising matter. Other objects will be in part apparent and in part pointed out hereinafter.

The invention accordingly comprises the elements and combinations of elements, steps and sequence of steps, features of construction and manipulation and arrangements of parts which will be exemplified in the structures and methods hereinafter described, and the scope of the application of which will be indicated in the following claims.

In the accompanying drawings, in which several of various possible embodiments of the invention are illustrated, Fig. 1 is a plan view of a blank adapted to be formed into a valved bag of this invention, with parts peeled away;

Fig. 2 is a plan view of another embodiment of a blank adapted to be formed into a valved bag of this invention, with parts peeled back;

Fig. 3 is a plan view of a further embodiment of a blank adapted to be formed into a valved bag of this invention, with parts peeled back;

Fig. 4 is a plan view of the Fig. 1 blank after initial folding, with parts peeled back;

Fig. 5 is a plan view of the blank of Fig. 4 after a further intermediate folding step;

Fig. 6 is an enlarged perspective view of a portion of the Fig. 5 blank during a succeeding folding step;

Fig. 7 is a flat plan view of the blank of Fig. 6 after completing the folding step of Fig. 6;

Fig. 8 is a plan view of a finished bag made from the Fig. 7 blank;

Fig. 9 is an enlarged section taken along line 9—9 of Fig. 8;

Fig. 10 is a plan view of the blank of Fig. 7 showing a slit valve extension;

Fig. 11 is an enlarged perspective view of a portion of a blank after an intermediate step in the formation of another valve embodiment from the blank of Figs. 6 and 7;

Fig. 12 is a plan view of the finished bag of the Fig. 11 blank;

Fig. 13 is an enlarged section taken along line 13—13 of Fig. 12;

Fig. 14 is an enlarged side view of the closed valve in the Fig. 12 bag;

Fig. 15 is a plan view of a blank after an intermediate step in the formation of a further valve embodiment in the blank of Fig. 5;

Fig. 16 is a plan view of the finished bag of the Fig. 15 blank;

Fig. 17 is a plan view of a blank after an intermediate step in the formation of an additional valve embodiment in the blank of Fig. 5;

Fig. 18 is an enlarged perspective view of a portion of the Fig. 17 blank;

Fig. 19 is a plan view of a folded and cut blank adapted to be formed with another valve embodiment, with parts peeled away;

Fig. 20 is a plan view of a blank after an intermediate step in the formation of a certain valve in the Fig. 19 blank;

Fig. 21 is a view similar to Fig. 20 showing a subsequent step;

Fig. 22 is a view similar to Fig. 16 but showing a portion of a modified form of a finished bag;

Fig. 23 is a plan view of a blank after an intermediate step in the formation of a tuck-in valve in the Fig. 19 blank;

Fig. 24 is a plan view of a portion of the finished bag made from the Fig. 23 blank, with parts broken away;

Fig. 25 is a side view of the closed valve of the Fig. 24 bag;

Fig. 26 is a plan view of a blank adapted to be formed into a labeled valved bag of this invention, with parts peeled back;

Fig. 27 is a plan view of another embodiment of a blank adapted to be formed into a labeled valved bag of this invention, with parts peeled back;

Fig. 28 is a plan view of a portion of the Fig. 26 blank after an initial folding step;

Fig. 29 is a plan view of a portion of the Fig. 28 blank after another and intermediate folding step;

Fig. 30 is a plan view of the Fig. 29 blank after a further folding step;

Fig. 31 is a plan view of the finished bag of the Fig. 30 blank; and,

Fig. 32 is a perspective view of the valve in the Fig. 31 bag.

Similar reference characters indicate corresponding parts throughout the several views of the drawings.

Hereinafter, seams are shown by simple dotted lines. These are to be understood as representing any of the usual seams used such as plain seaming, turned-in seaming, covered seams and the like.

Referring to the drawings, the valved bag of this invention is shown initially to comprise a blank generally designated 1 of textile bag material 3. The blank 1 has a narrow lip 5 of paper or the like extending from the bag material 3 at its upper edge preferably along the full length of the edge. A section of paper is secured to the bag web 3 to provide the lips, but the lip is considered to be only that portion of the valve material extending beyond the edge of the web. As such, the lip 5 may be a part of a narrow strip 7 of valve material such as paper secured by pasting to the upper margin of the bag web, or it may be an extension of the paper liner 9 of a lined bag, or it may be a combination of both strip 7 and paper-lined bag web, as shown respectively in Figs. 1–3. In Fig. 3 the strip 7 is adhered to the usual paper liner 58, the latter being adhesively attached as usual to the bag material 3. All of these may be considered to be extension bands.

The blank embodiment of Fig. 1 is preferably made by withdrawing a strip 7 of valve material from a substantially continuous supply, applying adhesive 11 to a margin 12 thereof and securing the strip to a margin of a bag web 3 withdrawn from a substantially continuous supply so that the non-adhered strip portion 5 extends beyond the web. The composite material is then cut into bag blanks of twice the desired bag width. Similarly, the other bag blanks of this invention may be made by substantially continuous methods of manufacture.

Though any of the above-described blanks may be made into any of the to-be-described valved bags, the Fig. 1 embodiment is taken as illustrative. A blank 1, comprising the bag web 3 and valve strip 7, is folded upon itself along a longitudinal central fold line A with the valve strip inside the web (Fig. 4). This provides a blank having front and rear walls, 13 and 15 respectively, integrally joined at fold A. The bag blank thus has at its upper edge front and rear valve sides or stiffeners, 17 and 19 respectively, which are integrally joined at fold A and extend the full width of the bag walls at the bag mouth when finished.

The particular bag blank is then provided with a suitable bag valve which may be constructed as described below. It should be noted that the order of presentation of the various types of valves is chosen to simplify discussion and does not necessarily represent the order of preference with respect to sift-proof quality and economy of manufacture, or either of these.

Referring to Fig. 5, the front valve side 17 and an adjacent portion 21 of the front bag wall are folded along a transverse fold line B back upon the front bag wall 13. That is, a portion 21 of the front bag wall is unfolded or folded apart from the rear bag wall. The folded portion 21 of the front bag wall is shown to be that amount of bag web which is backed by the adhered portion 12 of valve strip 7 and to be equal in size to the valve side 17, though this relation need not necessarily be followed. That is, the folded-back portion 21 may be only partially backed by valve material or may be of a size different than that of the valve side 17. Simultaneously the upper folded corner of the blank is flattened out or tucked in triangularly over the fold line B. This folding operation results in the formation of a triangular panel 23 having equal outer sides 25 and 27 and an inner edge 29. The triangular panel 23 overlies and joins two trapezoidal panels 31 and 33 at its equal outer sides 25 and 27 respectively. As shown, the panels are in part valve band or sleeve and in part bag wall. The outer triangular fabric portion 35 comprising bag wall is in effect like the known tucked-in valve flap. The inner truncated paper portion 37 of the lip 5 which extends from the inner edge 29 of valve flap 35 is in effect a valve-forming extension. Referring to Figs. 6–7, the extended paper sides, or stiffeners, 17 and 19, are folded back upon their adjacent bag walls, preferably along lines 2 and 4 adjacent the edge of the bag web. Simultaneously, the spaced corners 6 and 8 of the paper valve extension 37 are doubled in beneath the remainder of the extension 37 to reduce the extension to a triangular configuration 10 (Fig. 7) having an edge common to the inner valve flap edge 39. The fully doubled-in corners of the valve extension (shown at 14 and 34 in Fig. 7) were originally the triangular segments 6 and 8. Fig. 6 shows an intermediate position during folding.

Finally, the folded bag wall portion 21 is returned to its original position over the rear bag wall (Fig. 8). In so doing, the tucked-in valve flap 35 and the triangular valve extension 10 are folded upon themselves along the original fold line A. The mouth, bottom and open side edges of the folded blank are sealed as by stitching 16 leaving a passage 41 (Fig. 9) between the folds of the valve extension for insertion of a filler pipe. As the bag is filled, the valve is automatically closed by the reaction of the rising level of material upon the depending valve sides or stiffener and the valve extension therebetween. This self-closing valve embodiment may be characterized as a fully-doubled-in inside six-ply valve. As illustrated in Fig. 10, the inwardly directed valve extension 10 may be slitted as shown at 18 along its central line of folding up to the valve flap 35 if desired. This makes the six-ply inward valve extension more flexible since the two central plies become relieved from one another.

A further valve embodiment is presented in Figs. 11–13. The construction is the same as that of the previously described embodiment up to the point shown in Fig. 5. Then the valve extension 37 is outwardly folded on line 39 so as to overlie the tucked-in valve flap 35 as shown in Fig. 11; and the sides 17 and 19 are folded on lines 2 and 4. Finally, the blank is folded to the Fig. 12 position and stitching 16 applied. This embodiment is self-closing to a certain extent in view of the depending valve sides 17 and 19 along the top of the bag, but is principally sealed by manually rolling up and tucking in the now outwardly directed extension 37, as illustrated in Fig. 14.

Another form of valve is shown in Figs. 15–16. Again the construction is the same as previously described up to Fig. 5, except the valve sides 17 and 19 are folded upon the adjacent bag walls 13 and 15 without doubling under the triangles 6 and 8. That is, the valve sides 17 and 19, including the overlying portions of triangles 6 and 8, are simply folded back upon their respective bag walls 13 and 15 as shown in Fig. 15. The folded-back portion 21 is then returned to its original position as shown in Fig. 16. In this form the valve extension is rectangular in shape as shown at 20 and lies beneath the valve sides. The resulting triangular folded-under parts between the valve extension 20 and valve sides 17 and 19 are shown at 22. The valve extension 20 may be slit centrally along its fold line A, if desired. This corresponds to the slitting already described in connection with the form of the invention shown in Fig. 10.

A further type of valve is shown in Figs. 17–18. The folding steps are the same as those of the first described valve embodiment up to Fig. 5. In this form, as the valve sides 17 and 19 are folded upon the bag walls 13 and 15, portions of the corners of 6 and 8 of extension 37 are doubled under the remainder of the extension along folding lines C. The result is as shown in Figs. 17 and 18. This provides a rectangular valve extension 24 as in Fig. 15, except that the rectangular portion overlies the sides 17 and 19 (compare Fig. 15 on one hand and Figs. 17, 18 on the other hand). The result is a rectangular valve extension, overlying valve sides 17 and 19, which is anchored to the valve sides on lines C (Fig. 18). The final bag has a plan view similar to that shown in Fig. 16. As before, the valve extension 24 may be slit along its central line of folding up to the valve flap 35. Also if desired, prior to final folding, the inner corners 43 of the rectangular valve extension may be swung as shown by the dotted arrows 26 in Fig. 18.

A valved bag having a freely flexible rectangular valve extension is illustrated in Figs. 19–22. Such a valved bag is made by cutting the extending valve lip 5 along a pair of lines 45 equidistantly spaced from and parallel to the longitudinal central fold line A of blank 1. The front valve side 17 and an adjacent fabric portion 21 of the front bag wall 13 are folded down upon the front bag wall 13 and the triangular tucked-in fabric valve flap 35 formed as before. This leaves a rectangular inwardly directed paper valve extension 30. The cut lines define the ends of the rectangle. The rectangular valve sides 17 and 19 are then folded upon their respective bag walls 13 and 15 either beneath or above the valve extension 30. In Fig. 21 the folding is shown as being down underneath. Finally the front valve side 17 and adjacent bag wall portion 21 are refolded as before to produce an inwardly directed rectangular valve extension (see Fig. 22). The inwardly directed extension 30 may be slit on its bottom edge (line A) as previously described.

A tuck-in valve may be formed by swinging the valve extension 30 outward over the valve flap 35 as shown in Fig. 23. After folding up area 21 and seaming as at 16 a bag is obtained with an outwardly extending rectangular valve extension. This tuck-in valve is manually closed by tucking the extension 30 within the folded valve flap 35 (Fig. 25).

Referring to Figs. 26–32, the previously described valved bags may be modified to provide an outside label strip extending around the top margin of the bag, this strip also forming the material for the valve extension. A strip 51 of paper or the like is secured to the upper edge of a blank of bag web 3 so that a portion 53 of the strip extends beyond the edge of the web. Adhesive 55 may be applied to one margin 57 of the strip 51 and said margin 57 secured to a margin of bag web by a substantially continuous method of manufacture, as before. The area of margin 57 which backs web 3 may be varied in accordance with the area required for the display of advertising matter, such as shown at XYZ. The bag web 3 may be lined with paper 59. However, the strip 51 is secured upon the outside of the bag web and not to the inner liner 59. In Figs. 26–32 the width of adhesive attachment 55, 57 is less than that of the extension 53.

The composite blank is folded along a longitudinal central fold line A so that the strip 51 passes around the exterior of web 3. A valve of the type shown in Figs. 17 and 18 may then be made generally as previously described and as illustrated in Figs. 28–32. Since there is a slight difference in the positions of the parts, due to the strip 51 being attached outside of the bag body, the steps will be outlined. Starting with Fig. 28, the top front of the blank is folded down on line D. In this case the line D is not at the lower edge of the strip 51 but spaced below it. The result is as shown in Fig. 29, wherein the in-turned fabric flap is indicated by the triangle 61, which is composed of fabric partially overlaid by an inner part 63 of the paper strip 51. However, the paper strip extends beyond this overlay 63 by the distance indicated at 65. This distance 65 is equal to the width of extension 53. Next, the arrangement shown in Fig. 29 is folded over along the lines E and at the same time the triangles 67 are turned under, as indicated in Fig. 30. Finally, the parts are refolded along line D from the position shown in Fig. 30 to the final position shown in Fig. 31. Seaming is then accomplished as before and as shown at 69. This leaves a tucked-in fabric valve flap 71 from which there is a paper extension 73, the latter being an integral part of the label strip 51. The fact that the width of the attachment margin 57 is less than the width of extension 53 (Fig. 26) results in a less important part of the tucked-in fabric valve flap 71, so far as strength is concerned, being without a paper liner, as at 75 (see Figs. 31 and 32). This is of some advantage in saving paper by reducing the width of the paper strip for a given extension thereof into the bag.

From the above it will be seen that the invention has the following advantages: The material which extends from the bag mouth and is folded inward prior to seaming shut the mouth forms a stiffener at the mouth adjacent to the valve portions. This stiffener facilitates the introduction of a filling tube through the valve and well into the bag without snagging. It also strengthens the bag in the closed mouth portion where the bag hangs on such a filler tube. Hanging bags on filler tubes is common practice. In addition, the fact that the inwardly projecting stiffener is integral with paper parts that form the valve extension makes a strong construction.

Another advantage, in the case of the form shown in Figs. 26–32, is that the member which ultimately forms the valve extension and the inwardly direced stiffeners also provides label-forming area. In all forms of the invention the closing seam for the bag mouth anchors the inwardly directed stiffening elements.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings shall be interpreted as illustrative and not in a limiting sense.

We claim:

1. The method of making a valved bag comprising folding a rectangular blank along a side fold line to form rectangular front and back walls joined at said side fold line and having top edges, unfolding the top edge of one wall from the top edge of the other wall along a second fold line to form a triangular valve flap, said second fold line bisecting the triangle, oppositely in-folding on third fold lines the unfolded edges of said walls so that said edges are adjacent to said bisecting fold line, refolding the unfolded bag wall along the second bisecting fold line to enclose the in-folded edges between the front and back walls, and applying a closure to the resulting adjacent third fold lines.

2. The method of making a valved bag comprising folding a rectangular blank along a side fold line to form rectangular front and back walls joined at said side fold line and having top edges, unfolding the top edge of one wall from the top edge of the other wall along a second fold line to form a triangular valve flap, the direction of said second fold line bisecting the triangle, oppositely in-folding on third fold lines unfolded edges of said walls so that said edges are adjacent to said bisecting fold line, refolding the unfolded bag wall along the second bisecting fold line to enclose the in-folded edges between the front and back walls, seaming the resulting adjacent third fold lines, whereby a bag is produced having a valve with at least three plies in substantial parts of the valve and reinforcing extensions therefrom located within the closed bag mouth.

3. A method of making a reinforced valved bag comprising attaching to a mouth-forming edge of a rectangular body blank an extension band, folding the blank to overlay half of the band longitudinally upon its other half and to form front and back bag walls, folding apart the front and back walls along adjacent edges of the band halves near their edges which are attached to the blank while separating the outer unattached edges of the band halves to form a panel consisting of a tucked-in flap formed from the blank and an attached extension portion formed from the extension band, reverse folding only the band halves so as to bring their outer unattached edges together while manipulating the end parts of said bands and of said extension in said panel to form additional reinforcing areas of band material substantially coplanar with said attached extension portion, refolding the previously folded-apart portions of the bag walls to bring together the band halves inside the resulting bag and to bring together the final mouth-forming edge folds of the body blank, and joining said mouth-forming folds.

4. A method of making a reinforced valved bag comprising attaching to a mouth-forming edge of a rectangular body blank an extension band, folding the blank to overlay half of the band upon its other half and to form front and back bag walls, folding apart the front and back walls along adjacent edges of the band halves near their edges which are attached to the blank while separating the outer unattached edges of the band halves, to form a triangle consisting of an inturned flap formed from the blank and an attached extension portion formed from the extension band, reverse folding only the band halves so as to bring their outer unattached edges together while manipulating the end parts of said bands and of said extension portion of the band in said triangle to form additional reinforcing triangles of band material substantially coplanar with said attached extension portion, refolding the previously folded-apart portions of the bag walls to bring together the band halves inside the resulting bag and to bring together the final mouth-forming edge folds of the body blank, and joining said mouth-forming folds.

5. A valved bag formed of a blank of textile material having a paper section secured thereto and extending beyond an edge of the blank at one end of the bag so as to provide an elongate paper lip extending longitudinally along the end of the bag blank, a tuck-in valve at said end of the bag incorporating a portion of the textile material forming a portion of the valve and a portion of the paper lip forming a valve extension, other lengthwise portions of the lip being folded into the bag along fold lines near the edge of the textile material to provide inside paper reinforcing members extending beyond the valve extension along the end of the bag, and a seam at said end of the bag securing together both the textile material and the folded paper section along a line adjacent said fold lines.

6. A valved bag as set forth in claim 5 wherein the paper lip is continuous in a direction along the end of the bag, the reinforcing members being connected to the valve extension at fold lines which are angled with respect to said direction.

7. A valved bag as set forth in claim 5 wherein the paper lip portion is discontinuous in a longitudinal direction, the reinforcing members and the valve extension being generally rectangular.

8. A valved bag as set forth in claim 6 wherein the paper lip portion is folded at the valve in such manner as to provide a generally triangular valve extension.

9. A valved bag as set forth in claim 8 wherein the triangular valve extension projects into the bag from the textile portion of the valve, the reinforcing members extending along said end of the bag from between the valve extension and bag walls on opposite sides of the valve extension, and the reinforcing members being generally rectangular and joined to the triangular valve extension by triangular segments folded between the valve extension and the reinforcing members.

10. A valved bag as set forth in claim wherein the triangular valve extension projects in an outward direction but within the valve flap, the reinforcing members extending along said end of the bag from within the valve extension.

11. A valved bag as set forth in claim 9 wherein the valve extension is centrally slit along its bottom.

12. A valved bag formed of a blank of textile material having a paper section secured thereto and extending beyond an edge of the blank at one end of the bag so as to provide an elongate paper lip extending longitudinally along the end of the bag blank, a tuck-in valve at said end of the bag incorporating a portion of the textile material forming a portion of the valve and a portion of the paper lip forming a valve extension, other lengthwise portions of the lip being folded into the bag along fold lines near the edge of the textile material to provide inside paper reinforcing members extending beyond the valve extension along the end of the bag, and a seam at said end of the bag securing together both the textile material and the folded paper section along a line adjacent said fold lines, said paper lip being continuous in a direction along the end of the bag, said reinforcing members being connected to the valve extension at fold lines which are angled with respect to said direction, and said paper lip portion being folded in such manner as to provide a generally rectangular valve extension.

13. A valved bag as set forth in claim 12 wherein the rectangular valve extension projects into the bag from the valve flap, the reinforcing member extending along said end of the bag from within the valve extension and being joined to the valve extension by triangular segments folded between the valve extension and the reinforcing members.

14. A valved bag as set forth in claim 12 wherein the rectangular valve extension projects into the bag from the valve flap, the reinforcing members extending along said end of the bag from between the valve and the bag walls on opposite sides of the valve, the reinforcing members being joined to the rectangular valve extension by segments of the lip folded between the valve extension and the reinforcing members.

15. A valved bag comprising a generally rectangular blank of flexible textile material side-folded upon itself to provide front and back bag walls and a side fold, a relatively narrow stiff paper strip marginally adhered to the textile material so as to project from the top edge of the textile material, a top corner of the blank at the side fold being tucked in to provide a valve flap with a portion of the paper strip providing a valve extension, other lengthwise portions of the paper strip being folded into the bag along fold lines near the edge of the textile material to provide paper reinforcing members extending beyond the valve flap at the top of the bag, and a seam at said end of the bag securing together both the textile material and the folded paper strip along a line adjacent to said fold lines.

16. A valved bag as set forth in claim 15 wherein the paper strip is marginally adhered to the outside of the textile bag blank to provide a paper label area at the top of the bag over the textile blank.

17. A valved bag as set forth in claim 15 wherein the strip extends the full width of both front and back bag walls.

CHARLES V. BRADY.
AUGUST F. OTTINGER.

REFERENCES CITED

The following references are of record in the file of this patent:

UNITED STATES PATENTS

| Number | Name | Date |
|---|---|---|
| 626,680 | Ellis | June 13, 1899 |
| 1,682,839 | Finn | Sept. 4, 1928 |
| 2,040,337 | Rosmait | May 12, 1936 |
| 2,201,675 | Vogel | May 21, 1940 |
| 2,275,505 | Crawford | Mar. 10, 1942 |
| 2,330,255 | Ames | Sept. 28, 1943 |
| 2,331,536 | Cerf | Oct. 12, 1943 |
| 2,392,094 | Lee | Jan. 1, 1946 |

FOREIGN PATENTS

| Number | Country | Date |
|---|---|---|
| 546,709 | Germany | Mar. 3, 1932 |